United States Patent

Settles et al.

[11] Patent Number: 5,956,247
[45] Date of Patent: Sep. 21, 1999

[54] REDUCING INPUT SIGNAL LEVELS TO A MICROPROCESSOR

[75] Inventors: Steven R. Settles, Sterling Heights; Darrell J. Kolomyski, New Baltimore, both of Mich.

[73] Assignee: Lear Automotive Dearborn, Inc., Southfield, Mich.

[21] Appl. No.: 08/792,690

[22] Filed: Jan. 29, 1997

Related U.S. Application Data

[63] Continuation-in-part of application No. 08/645,138, May 13, 1996, abandoned, which is a continuation of application No. 08/289,145, Aug. 11, 1994, abandoned, which is a continuation of application No. 07/967,484, Oct. 26, 1992, abandoned.

[51] Int. Cl.$^6$ .............................. G05B 11/01; B60L 1/00
[52] U.S. Cl. .................................... 364/140.01; 307/10.1
[58] Field of Search .................................. 364/140, 141, 364/142, 140.01–140.1; 307/10.1, 11, 38; 370/85.1, 85.3, 476; 340/825.62, 825.63, 825.61

[56] References Cited

U.S. PATENT DOCUMENTS

| | | |
|---|---|---|
| 4,392,125 | 7/1983 | Iwata ....................................... 340/518 |
| 4,438,425 | 3/1984 | Tsuchida et al. .............. 340/825.62 X |
| 4,513,365 | 4/1985 | Franz et al. ............................. 307/38 X |
| 4,578,591 | 3/1986 | Floyd et al. ........................... 307/10.1 |
| 4,697,092 | 9/1987 | Roggendorf et al. .................. 307/10.1 |
| 4,788,447 | 11/1988 | Kiyono et al. ......................... 307/10.1 |
| 4,845,415 | 7/1989 | Steely ................................. 307/10.1 X |
| 4,883,974 | 11/1989 | Tinder ...................................... 307/38 |
| 4,942,571 | 7/1990 | Moller et al. .......................... 370/85.1 |
| 5,200,676 | 4/1993 | Mueller et al. .................... 307/10.1 X |
| 5,287,353 | 2/1994 | Buda et al. ............................ 370/85.1 |

*Primary Examiner*—Paul P. Gordon
*Assistant Examiner*—Steven R. Garland
*Attorney, Agent, or Firm*—Brooks & Kushman P.C.

[57] ABSTRACT

A plurality of switches are connected to a lesser plurality of shift registers which are controlled by the microcontroller to provide serial binary signals over a single data line with a voltage level clamp by a zener diode in response to clock pulses. A second plurality of switches and rheostats are supplied to a lessor plurality of multiplexers. One of the input channels to each of the multiplexers is selected in response to a channel select signal provided by the microcontroller. The registers and multiplexers produce output signals that are clamped to a lower microcontroller operating level. Signals from the microcontroller are skipped as to control the registers and multiplexers. The operation of the switches and rheostats is used by the microcontroller to control the power devices such as lights, windows, turn signals and air conditioning.

17 Claims, 2 Drawing Sheets

REDUCING INPUT SIGNAL LEVELS TO A MICROPROCESSOR

CROSS REFERENCE

This application is a continuation-in-part of application Ser. No. 08/645,138, filed May 13, 1996, now abandoned, which is a continuation of application Ser. No. 08/289,145, filed Aug. 11, 1994, now abandoned, which is a continuation of application Ser. No. 67/967,484 filed on Oct. 26, 1992, now abandoned.

This application describes apparatus also described in the application entitled "Monitoring and Protecting Drives Controlled With A Microcontroller" by Steven R. Settles, John A. Barrs and Darrell J. Kolomyski and application entitled "Monitoring The Characteristics Of A Load Driver Controlled By A Microcontroller" by John A. Barrs and Darrell J. Kolomyski, both applications being assigned to United Technologies Automotive, Inc. and filed simultaneously herewith.

TECHNICAL FIELD

This invention relates to microcontrollers that control devices such as relays, power windows and windshield wipers in an automobile.

BACKGROUND OF THE INVENTION

The proliferation of microcontrollers in automobile systems is a major advance in the art, one making it possible to control many functions more economically and precisely as compared to simple switches used in the past. The microcontroller is a critical element in a vehicle "electronic module", which, in most cases, provides an array of outputs capable of providing control signals for equipment and systems such as wipers, power windows and headlamps. The microcontroller has analog and digital inputs to receive signals from analog and digital input devices, such as switches, potentiometers and digital sensors and signal processors. However, a typical low cost controller, such as the Motorolla model MC 68HC05B6, has a limited number of analog and digital inputs, placing limits on the number of input channels to an electronic module using it. This places practical limits on the complexity and number of devices and functions that the microcontroller can control.

In automobile applications, a rudimentary way to provide a suitable digital input to a microcontroller is to apply battery voltage from a switch through a resistor to a controller input having a zener diode clamp to clamp the in/out voltage. The series resistor limits current to the microcontroller input; the zener diode limits input voltage to a safe input TTL logic level, usually in the range of 5 volts peak. These traditional methods can be very costly, however, when a significant number of analog and digital inputs to the microcontroller are used.

DISCLOSURE OF THE INVENTION

An object of the present invention is providing an economical way of reducing input signal levels to a microcontroller having different input devices, such as switches, and rheostats connected to a voltage source greater than the allowable input voltage to the microcontroller.

According to a first embodiment of the present invention, a system for controlling a plurality of devices is disclosed. Each device of the plurality comprises an activating status corresponding with each control signal of a number of control signals received by the system. The system comprises a first means, responsive to a clock signal, for producing a serial signal having a first voltage and a multiplicity of data bits, each data bit of the multiplicity corresponding with a control signal of the number. The system also comprises means for clamping the serial signal to a second voltage below the first voltage. Additionally, the system comprises means for producing the clock signal according to a routine correlating each data bit of the multiplicity with a device of the plurality. The system moreover comprises a microcontroller for intermittently polling the activating status of each device of the plurality, and for controlling the activating status of each device in response to receiving the clamped serial signal.

According to a second embodiment of the present invention, a system for controlling a plurality of devices is disclosed. Each device of the plurality comprises an operating status corresponding with each control signal of a number of control signal received by the system. The system comprises a first means for receiving each control signal of the number, and for selectively transmitting a control signal of the number corresponding with a selected device and having a first voltage in response to a select signal. Additionally, the system comprises a means for clamping the selectively transmitted control signal to a second voltage below the first voltage. The system further comprises a means for producing the select signal according to a routine correlating the select signal to each control signal of the number and a device of the plurality. Moreover, the system comprises a microcontroller for intermittently polling the activating status of each device of the plurality, and for controlling the operating status of the selected device in response to receiving the clamped selectively transmitted control signal.

According to a third embodiment of the present invention, an automotive system is disclosed. The automotive system comprises a plurality of vehicle devices, each device of the plurality having an activating status, and a number of switches each of which for generating a control signal corresponding with a vehicle device of the plurality such that a number of control signals are generated. Moreover, the automotive system also comprises a shift register for receiving each control signal of the number and for producing a serial signal of data bits at a first voltage in synchronism with a clock signal, each data bit of the data bits corresponding with a control signal of the number. The automotive system also comprises a zener diode for clamping the serial signal to a second voltage, the second voltage being less than the first voltage. Furthermore, the automotive system comprises a microcontroller for intermittently polling the activating status of each device of the plurality, for producing the clock signal according to a routine correlating each data bit of the serial signal with a device of the plurality, and for controlling the activating status of each device of the plurality in response to receiving the clamped serial signal.

According to a fourth embodiment of the present invention, an automotive system is disclosed. The system comprises a plurality of vehicle devices each of which having an operating status. Further, the system comprises a number of switches each of which for generating a control signal corresponding with a vehicle device of the plurality such that a number of control signals are generated. The system also comprises an analog multiplexer for receiving each control signal of the number and for selectively transmitting a control signal of the number corresponding with a selected vehicle device and having a first voltage in response to a select signal. Moreover, the system comprises a zener diode for clamping the transmitted control signal from the multiplexer to a second voltage below the first voltage. The system additionally comprises a microcontroller for intermittently polling the activating status of each device of the plurality, for producing the select signal according to a routine correlating the select signal to a control signal of the number and a device of the plurality, and for controlling the operating status of the selected vehicle device in response to receiving the clamped selectively transmitted control signal.

According to a fifth embodiment of the present invention, an automotive system for controlling a number of vehicle devices is disclosed. The system has a plurality of enabling signals as inputs, each of which correspond with a vehicle device of the number of vehicle devices. The system comprises a shift register for serializing the plurality of enabling signals such that a serialized enabling signal is generated in response to a clock signal generated according to a routine correlating the serialized enabling signal with a device of the number. Furthermore, the system comprises a voltage clamp for clamping the serialized enabling signal such that a clamped serialized enabling signal is generated. The system additionally comprises a microcontroller for intermittently polling the activating status of each device of the plurality, and for controlling each vehicle device of the number in response to the clamped serialized enabling signal.

According to a sixth embodiment of the present invention, an automotive system for controlling a number of vehicle devices is disclosed. The system has a plurality of enabling signals as inputs, each of which correspond with a vehicle device of the number of vehicle devices. The system comprises a multiplexer for receiving each enabling signal of the plurality and for selectively transmitting an enabling signal of the plurality in response to a select signal generated according to a routine correlating each enabling signal of the plurality to a device of the number. The selectively transmitted enabling signal directly corresponds with a selected vehicle device and has a first voltage. The system also comprises a voltage clamp for clamping the selectively transmitted enabling signal such that a clamped selectively transmitted enabling signal is generated. Moreover, the system comprises a microcontroller for intermittently polling the activating status of each device of the plurality, and for controlling each vehicle device of the number in response to the clamped selectively transmitted enabling signal.

According to a further embodiment of the present, a plurality of switches are connected to individual inputs on a plurality of shift registers. A microcontroller provides a single clock pulse simultaneously to the shift registers. The outputs of the shift register, which are at the system voltage, are connected in series. On each clock pulse a bit, which is either high (at system voltage) or low depending on the state of one switch, is supplied over a single data input line to the microcontroller. The data input line uses a zener diode to clamp the input voltage to the lower controller voltage.

According to still a further embodiment of the present, a plurality of switches and controls are connected to individual inputs on an analog multiplexer. The multiplexer receives an input select command from the microcontroller causing it to produce a multiplexer output. The voltage of the output is the voltage of the multiplexer input. The output from the multiplexer is supplied through a resistor to an input on the microcontroller. A zener diode connects the input to ground. A resistor is placed in parallel with the zener diode, and resistor limits current between the multiplexer output and the microcontroller input.

According to yet still a further embodiment of the present, clock and strobe signals are supplied to the shift registers and on the select signal to the analog multiplexers through a step up current driver that responds to signals produced by the view controller but at the controller voltage.

Among the features of the present invention is that it significantly reduces the number of suppressor diodes and limiting resistors in a system. For instance, it is possible, using the invention, to use three eight bit shift registers to generate control signals to one signal microcontroller from twenty-four (24) switches and control twenty-four (24) functions separately using one microcontroller input. Another feature of the present invention is that by using the shift registers and analog multiplexers, control signals can be supplied to the microcontroller from devices other than switches, such rheostats and potentiometers, as well as special switch configurations such as double pole, double throw switches, and digital sensors and signal processors. Still another feature of the invention is that one microcontroller can be used with shift registers and multiplexers, giving it the capability of responding to a wide array of different input signals.

Other objects, benefits and features of the invention will be apparent to those skilled in the art from the following drawings and discussion of the invention.

BEST MODE FOR CHANGING OF THE INVENTION

Figure 1:
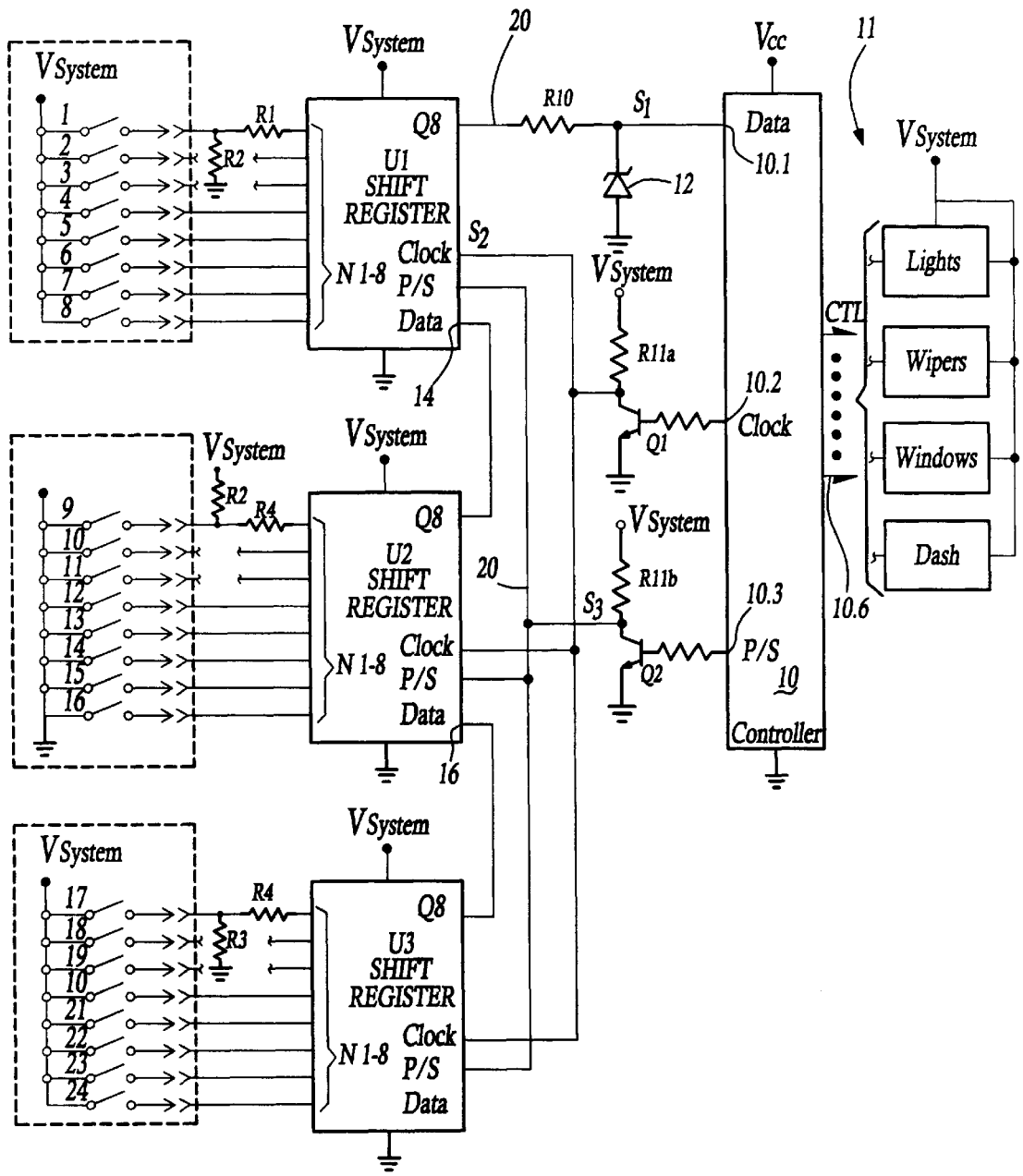
FIG. 1, a functional block diagram of a system embodying the invention, shows a microcontroller system with a plurality of shift registers connected to a plurality of switches.

Referring to FIG. 1, a microcontroller 10 has three signal ports, data input 10.1, clock/strobe input 10.2, and pulse/reset 10.3, all operating at VCC (the microcontroller supply voltage). The microcontroller is used to simultaneously operate devices or equipment 11, such as vehicle lights, windows, dash board lights (dash), for that matter any other of a host of electrical devices typically used in an automobile. Each of a plurality of switches 1–24 is available to control one of the devices. The switches 1–24 are connected to shift registers U1, U2 and U3 in three banks of eight switches. As noted throughout this discussion, different switch configurations (e.g. different inputs) are shown to demonstrate the universality of the system embodying the present invention.

Specifically, the embodiment in FIG. 1 shows three switch arrangements, typifying different ways to control devices from switches connected to a system voltage supply that is higher than the microcontroller input voltage level. In a first switch arrangement, switches 1–8 apply voltage to a voltage divider comprising resistors R1 and R2, creating an input signal on the line 1.1 from a system voltage source VSystem with a higher voltage than VCC (e.g. battery voltage, between 12 and 16 volts). Actuation of any one of switches 1–8 applies VSystem to the controller input (e.g on line 1.1 for switch 1) as a switch state signal S1. The switches 9–16 are in a different arrangement with shift register U2. There, each switch is connected to corresponding resistors R2, R4 that create a voltage divider. Switch actuation produces a voltage drop from VSystem when the switch is actuated. The switches 17–24 associated with shift register U3, are, on the other hand, connected with the configuration used with shift register U1.

The data input 10.1 on the microcontroller uses one zener diode 12 to clamp the input voltage to no greater than VCC. Data input 14 on register U1 receives data from the data output Q8 on the register U2 and the data input 16 on the register U2 receives the data output from output terminal Q8 on register U3. The clock input on each register responds to the voltage drop S2 from VSystem across a resistor R 11a when a transistor Q1 is turned on by the digital output on the clock port on the microcontroller, that digital output having a maximum level of VCC. The microcontroller produces a strobe signal at port 10.3, activating a transistor Q2, producing a strobe signal S3, with a maximum value of VSystem, from current change in resistor R 11b.

The microcontroller, is assumed to be programmed to generate the clock pulses in synchronism with internal instructions (e.g. a stored program) correlating each clock pulse to a switch, so that as the bit stream on line 20 changes, bit by bit, the state of each bit is correctly associated with a device and its drive.

The signal S2, applied to the clock input of each shift register, causes the signal S1 to have either a high or low state, indicating the status of a corresponding switch, for instance switch 1 for the first pulse (bit). Thus, on the first clock pulse, the first value of S1 will indicate whether a switch (e.g. switch) 1 is open or closed. Once that happens, the microcontroller provides, from the outputs 10.6, an on or off signal CTL to the device associated with the switch based on the state of signal S1 for the switch, which has been assumed for simplicity to include a drive that responds to the signal to apply or remove VSystem from the device. In so doing, microcontroller 10 intermittently polls the activating status of each of the devices 11 to reduce power consumption and conserve energy. This may include reducing the quiescent current. The signal CTL controls power from VSystem to the device directly or through a power delay.

Figure 2:
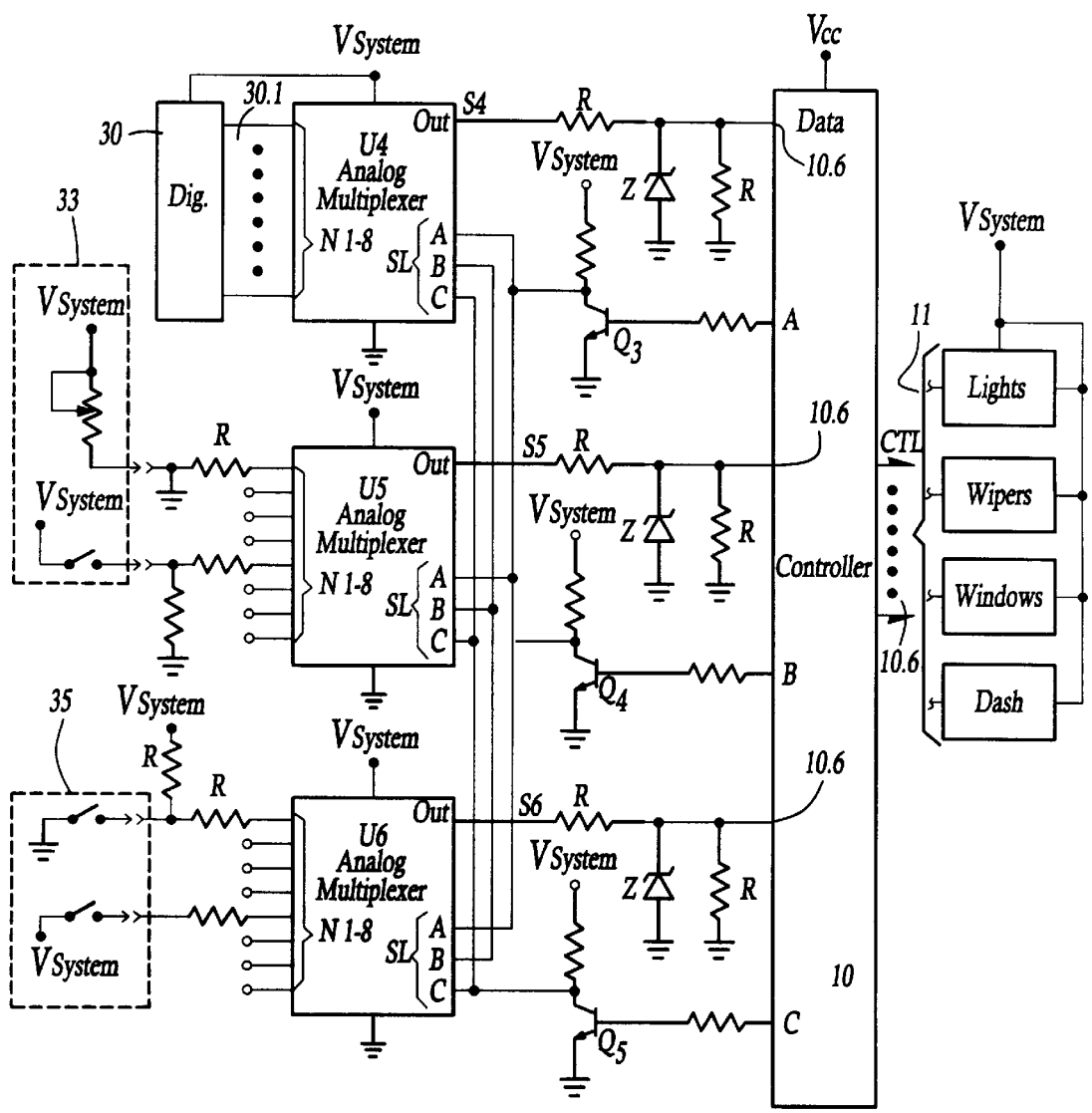
FIG. 2, a functional block diagram of a system embodying the invention, shows a microcontroller system with a plurality of analog multiplexers connected to a plurality of switches.

Referring to FIG. 2, once again a controller 10 is shown connected to control a plurality of devices such as light windows, signals and air conditioning, but here the controller contains analog and digital inputs 30, 33, 35. The controller contains three outputs A, B and C that drive transistors Q3–Q5 to produce selection signals SL with levels of VSystem that are applied simultaneously to each of three analog multiplexers U4–U6 (channels) to select one of N1-8 inputs on each multiplexer as the multiplexer output. That output comprises the signals S4–S5 and they are respectively applied to the inputs 10.6, which may thereby receive analog associated (0-VSystem) signals or digital (VCC) signals, depending on the type of devices 30, 33, 35 used. It should be recognized that the devices 30, 33 and 35 are different in the sense that input 30 may comprise digital devices capable of producing an input 30.1 (therefore a multiplexer output S4 at the same level) anywhere from VCC to VSystem. The block 33 shows that switches and rheostats can be connected to VSystem, producing inputs with a range from zero volts to VSystem, which again would appear as signal S5. Block 35 shows that simple switches may be used to pull the input to multiplexer U6 down from VSystem, and as with the other multiplexers, the input would appear on the output S6. As noted before, the state of each multiplexer's output will depend on the state of the lines A, B, C, which define an eight bit code. The levels of A, B, C, are at VSystem due to transistor drives Q3, Q4, Q5. For each multiplexer, the outputs S4, S5, S6 are clamped at VCC by a zener diode Z. In this way, both analog and digital devices 30, 33, 35 can be used using a stored correlation program, the controller 10 provides the CTL signal associated with the three bit (ABC) selection signal SL for each signal S4, S5, S6 to its associated device 11, turning the device on or off, based on the level of the signal. In so doing, microcontroller 10 intermittently polls the activating status of each of the devices 11 to reduce power consumption and conserve energy. This may include reducing the quiescent current. As mentioned before, the CTL signal may control a current driver or power relay or both to connect or disconnect VSystem from a device.

Both embodiments demonstrate that it is possible to use a wide variety of switching devices to control lights, windows, signals and other apparatus in an automotive vehicle or similar equipment. Actual voltage level shifting takes place through the use of a limited number of voltage dividers (resistors R30 and R31). It is possible to provide a microcontroller that uses both embodiments, but these have been shown separately to simplify the explanation of the invention.

With the benefit of the foregoing discussion, one skilled in the art may be able to make modifications and variations to the described embodiments of the invention without departing from the true scope and spirit of the invention.

We claim:

1. A automotive system for controlling a plurality of devices, each device of said plurality having an activating status, said system receiving a number of control signals, the activating status of each device of said plurality corresponding with each control signal of said number, said system comprising:

first means, responsive to a clock signal, for producing a serial signal having a first voltage, said serial signal having a multiplicity of data bits, each data bit of said multiplicity corresponding with a control signal of said number;

means for clamping said serial signal to a second voltage, said second voltage being below said first voltage;

means for producing the clock signal according to a routine, said routine correlating each data bit of said multiplicity with a device of said plurality; and a microcontroller for intermittently polling the activating status of each device of said plurality, and for controlling the activating status of each device of said plurality in response to receiving said clamped serial signal.

2. A system according to claim 1, wherein the first means comprises a shift register.

3. The automotive system of claim 1 wherein said means for producing the clock signal comprises said microcontroller running said routine.

4. A automotive system for controlling a plurality of devices, each device of said plurality having an operating status, said system receiving a number of control signals, the operating status of each device of said plurality corresponding with each control signal of said number, said system comprising:

first means for receiving each control signal of said number, and for selectively transmitting a control signal of said number in response to a select signal, said selectively transmitted control signal corresponding with a selected device and having a first voltage;

means for clamping said selectively transmitted control signal to a second voltage, said second voltage being below said first voltage;

means for producing the select signal according to a routine, said routine correlating said select signal to each control signal of said number and a device of the plurality; and a microcontroller for intermittently polling the activating status of each device of said plurality, and for controlling the operating status of said selected device in response to receiving said clamped selectively transmitted control signal.

5. A system according to claim 4, wherein the first means comprises an analog multiplexer.

6. An automotive system comprising:

a plurality of vehicle devices, each device of said plurality having an activating status;

a number of switches, each switch of said number for generating a control signal corresponding with a vehicle device of said plurality such that a number of control signals are generated;

a shift register for receiving each control signal of said number and for producing a serial signal of data bits at a first voltage in synchronism with a clock signal, each data bit of said data bits corresponding with a control signal of said number;

a zener diode for clamping the serial signal to a second voltage, said second voltage being less than said first voltage; and a microcontroller for intermittently polling the activating status of each device of said plurality, for producing said clock signal according to a routine, said routine correlating each data bit of said serial signal with a device of said plurality, and for controlling the activating status of each device of said plurality in response to receiving said clamped serial signal.

7. An automotive system comprising:

a plurality of vehicle devices, each device of said plurality having an operating status;

a number of switches, each switch of said number for generating a control signal corresponding with a vehicle device of said plurality such that a number of control signals are generated;

an analog multiplexer for receiving each control signal of said number and for selectively transmitting a control signal of said number in response to a select signal, said selectively transmitted control signal corresponding with a selected vehicle device and having a first voltage;

a zener diode for clamping the transmitted control signal from the multiplexer to a second voltage, said second voltage being less than said first voltage; and a microcontroller for intermittently polling the activating status of each device of said plurality, for producing said select signal according to a routine, said routine correlating said select signal to a control signal of said number and a device of the plurality, and for controlling the operating status of said selected vehicle device in response to receiving said clamped selectively transmitted control signal.

8. A method of applying power to a number of vehicle devices using a plurality of switches having an operating status, each switch of said plurality for controlling a device of said number, said method comprising the steps of:

providing a device control signal indicating the operating status of a switch of said plurality in response to a select signal provided from a microcontroller and being at a first voltage;

clamping said device control signal to a second voltage, said second voltage being below said first voltage;

receiving the device control signal on an input on a microcontroller;

providing the select signal according to a routine stored in the microcontroller, the routine correlating the select signal to the device control signal and a vehicle device of said number;

powering a first device of said number by providing a drive signal to the first device in response to the device control signal being correlated to the first device according to the stored routine.

9. A method of applying power to a number of vehicle devices using a plurality of switches having an activating status, each switch of said plurality for controlling a device of said number, said method comprising the steps of:

generating a serial signal comprising a multiplicity of data bits in response to a clock signal, each data bit of said multiplicity indicating the activating status of a switch of said plurality;

clamping said serial signal to a second voltage, said second voltage being below said first voltage;

receiving the serial signal on an input terminal of a microcontroller;

providing said clock signal according to a routine stored in the microcontroller that correlates each bit of said multiplicity with a device of said number;

controlling the activating status of each device of said plurality in response to said microcontroller receiving each bit of said multiplicity of said clamped serial signal.

10. A automotive system for controlling a number of vehicle devices, said system having a plurality of enabling signals as inputs, each enabling signal of said plurality corresponding with a vehicle device of the number of vehicle devices, said system comprising:

a shift register for serializing said plurality of enabling signals such that a serialized enabling signal is generated in response to a clock signal, said clock signal being generated according to a routine, said routine correlating said serialized enabling signal with a device of said number;

a voltage clamp for clamping said serialized enabling signal such that a clamped serialized enabling signal is generated; and a microcontroller for intermittently polling the activating status of each device of said plurality, and for controlling each vehicle device of the number in response to said clamped serialized enabling signal.

11. The system of claim 10, wherein said microcontroller comprises a clock system for generating said clock signal.

12. The system of claim 10, wherein each enabling signal of said plurality comprises a first voltage level, and said voltage clamp comprises a zener diode for clamping said serialized enabling signal to a second voltage level below said first voltage level.

13. The system of claim 10, further comprising a plurality of switches, each switch of said plurality for generating one enabling signal of said plurality.

14. The system of claim 13, wherein each of said plurality of switches comprises a first and a second resistor for forming a voltage divider circuit.

15. A automotive system for controlling a number of vehicle devices, said system having a plurality of enabling signals as inputs, each enabling signal of said plurality corresponding with a vehicle device of the number of vehicle devices, said system comprising:

a multiplexer for receiving each enabling signal of said plurality and for selectively transmitting an enabling signal of said plurality in response to a select signal, said select signal generated according to a routine, said routine correlating each enabling signal of said plurality to a device of the number, said selectively transmitted enabling signal corresponding with a selected vehicle device and having a first voltage;

a voltage clamp for clamping said selectively transmitted enabling signal such that a clamped selectively transmitted enabling signal is generated; and a microcontroller for intermittently polling the activating status of each device of said plurality, and for controlling each vehicle device of said number in response to said clamped selectively transmitted enabling signal.

16. The system of claim 15, wherein said voltage clamp comprises a zener diode for clamping each enabling signal generated by each switch of said plurality to a second voltage level below said first voltage level.

17. The system of claim 16, wherein said multiplexer comprises a first and a second multiplexer and a selection transistor for selecting between said multiplexers in response to said output signal.

* * * * *